United States Patent
Koto et al.

(10) Patent No.: US 7,298,913 B2
(45) Date of Patent: Nov. 20, 2007

(54) VIDEO ENCODING METHOD AND APPARATUS EMPLOYING MOTION COMPENSATED PREDICTION INTERFRAME ENCODING, AND CORRESPONDING VIDEO DECODING METHOD AND APPARATUS

(75) Inventors: Shinichiro Koto, Machida (JP); Takeshi Chujoh, Tokyo (JP); Yoshihiro Kikuchi, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 756 days.

(21) Appl. No.: 10/396,437

(22) Filed: Mar. 26, 2003

(65) Prior Publication Data

US 2004/0017951 A1 Jan. 29, 2004

(30) Foreign Application Priority Data

Mar. 29, 2002 (JP) ............................. 2002-097892

(51) Int. Cl.
*G06K 9/36* (2006.01)
*G06K 9/46* (2006.01)

(52) U.S. Cl. ..................... 382/239; 382/236; 382/238

(58) Field of Classification Search ................. 382/239
See application file for complete search history.

(56) References Cited

U.S. PATENT DOCUMENTS

| | | | |
|---|---|---|---|
| 6,037,987 A * | 3/2000 | Sethuraman | 375/240.03 |
| 6,052,150 A * | 4/2000 | Kikuchi et al. | 375/240.16 |
| 6,097,842 A * | 8/2000 | Suzuki et al. | 382/232 |
| 6,167,158 A * | 12/2000 | Boon | 382/238 |
| 6,343,156 B1 * | 1/2002 | Yamaguchi et al. | 382/243 |
| 6,510,249 B1 * | 1/2003 | Boon | 382/238 |

FOREIGN PATENT DOCUMENTS

| | | |
|---|---|---|
| JP | 7-95589 | 4/1995 |
| JP | 10-136372 | 5/1998 |
| JP | 2000-32446 | 1/2000 |
| JP | 2001-28757 | 1/2001 |
| WO | WO 02/05563 A1 | 1/2002 |

OTHER PUBLICATIONS

International Standard ISO/IEC 13818-2 : 2000 (E), Dec. 2000, pp. 99-102.

(Continued)

*Primary Examiner*—Wenpeng Chen
*Assistant Examiner*—Yuzhen Ge
(74) *Attorney, Agent, or Firm*—Oblon, Spivak, McClelland, Maier & Neustadt, P.C.

(57) ABSTRACT

A method for encoding a video block using reference blocks comprises assigning the video block to one of first and second prediction groups, and encoding the video block according to a motion compensated prediction encoding mode, using the reference blocks depending on the one of the first and second prediction groups to which the video block is assigned, one of the reference blocks being a decoded block, wherein a first prediction group is obtained by a prediction using the reference blocks belonging to a first prediction group, and a second prediction group is obtained by a prediction using the reference blocks belonging to at least one of the second prediction group and the first prediction group.

4 Claims, 8 Drawing Sheets

OTHER PUBLICATIONS

"Recommendation H.263: Video Coding For Low Bit Rate Communication", ITU-T Draft Recommendation H.263, XP-002176560, Feb. 1998, pp. 1-167.

Stephan Wenger, "Temporal Scalability Using P-Pictures For Low-Latency Applications", Multimedia Signal Processing, XP-010318327, Dec. 7, 1998, pp. 559-564.

Marta Karczewicz, et al., "A Proposal for SP-frames", ITU-Telecommunications Standardization Sector VCEG-L27, XP-002287038, Jan. 9-12, 2001, pp. 1-9.

"H. 26L Test Model Long Term No. 5 (TML-5) draft0.", ITU-Telecommunications Standardization Sector of ITU, XP-001086628, Aug. 22-25, 200, pp. 1-31.

"Motion Image Encoding Technique in Internet/Mobile Communication," Triceps, Aug. 30, 2000, pp. 74 to 78, "PTYPE" and "ELNUM" in "1.4.1 Picture Layer".

* cited by examiner

VIDEO ENCODING METHOD AND APPARATUS EMPLOYING MOTION COMPENSATED PREDICTION INTERFRAME ENCODING, AND CORRESPONDING VIDEO DECODING METHOD AND APPARATUS

CROSS-REFERENCE TO RELATED APPLICATIONS

This application is based upon and claims the benefit of priority from the prior Japanese Patent Application No. 2002-97892, filed Mar. 29, 2002, the entire contents of which are incorporated herein by reference.

BACKGROUND OF THE INVENTION

1. Field of the Invention

The present invention relates to a video encoding method and apparatus and a video decoding method and apparatus with the use of a motion compensated prediction intra frame encoding.

2. Description of the Related Art

As a video compression encoding technique, MPEG 1 (ISO/IEC 11172-2), MPEG2 (ISO/IEC 13818-2), MPEG 4 (ISO/IEC 14496-2) are put to practical use broadly. These video encoding modes are performed by a combination of an intra frame encoding, a forward prediction intra frame encoding, an encoding and a bi-directional prediction intra frame encoding. The frames encoded by these encoding modes are called I picture, P picture and B picture. P picture is encoded using as a reference frame P or I picture just before the former P picture. B picture is encoded using as reference frame P or I picture just before and after the B picture. The forward prediction interframe encoding and bi-directional prediction interframe encoding are referred to as a motion compensated prediction interframe encoding.

When the video encoding data based on the MPEG mode is played back in fast-forward, a method that only I picture that the reference frame is not required is played back or a method that only I and P pictures is decoded while skipping B picture using a nature that B picture cannot be used as a reference frame is conventional. However, when only I picture is played back, if the period of I picture is long, a high-speed fast-forward playback can be carried out but a smooth fast-forward playback cannot be carried out. In a fast-forward playback with the use of I and P pictures, since P picture is encoded by an interframe prediction encoding, all I and P pictures must be decoded. For this reasons, it becomes difficult to change a fast-forward speed freely.

In the video encoding of the conventional MPEG mode, B picture is not used as a reference frame. Therefore, in case of the prediction configuration that plural B pictures continue, B picture must be encoded using P picture separating from B picture with respect to a time as a reference frame. This results in a problem that the encoding efficiency of B picture deteriorates. On the other hand, when the decoded B picture is used as a reference frame in P picture, it is necessary to decode all frames including B picture in the fast-forward playback while skipping B picture. As a result, it becomes difficult to perform the fast-forward playback effectively.

As described above, when the video encoded data obtained by the encoding including a motion compensated prediction interframe encoding such as MPEG is played back with a fast-forward, it is difficult to perform a smooth fast-forward playback at a free playback speed in playing back only I picture. When the fast-forward playback is performed with skipping B picture without decoding it, it is difficult to use the decoded B picture as a reference frame. For this reason, there is a problem that the encoding efficiency deteriorates in a prediction configuration that the B pictures continue.

BRIEF SUMMARY OF THE INVENTION

It is an object of the invention is to provide a video encoding and decoding method and apparatus using a motion compensated prediction interframe encoding, that enable a fast-forward playback at a high encoding efficiency and a high degree of freedom in the decoding side.

According to an aspect of the invention, there is provided a method for encoding a video block using reference blocks, comprising assigning the video block to one of a plurality of prediction groups including at least first and second prediction groups; and encoding the video block according to a motion compensated prediction encoding mode, using the reference blocks depending on the one of the prediction groups to which the video block is assigned, one of the reference blocks being a decoded block, wherein the first prediction group is obtained by a prediction using the reference blocks belonging to the first prediction group, and the second prediction group is obtained by a prediction using the reference blocks belonging to at least one of the second prediction group and the first prediction group.

DETAILED DESCRIPTION OF THE INVENTION

An embodiment of the present invention will be described with reference to accompanying drawings.

(Encoding)

Figure 1:
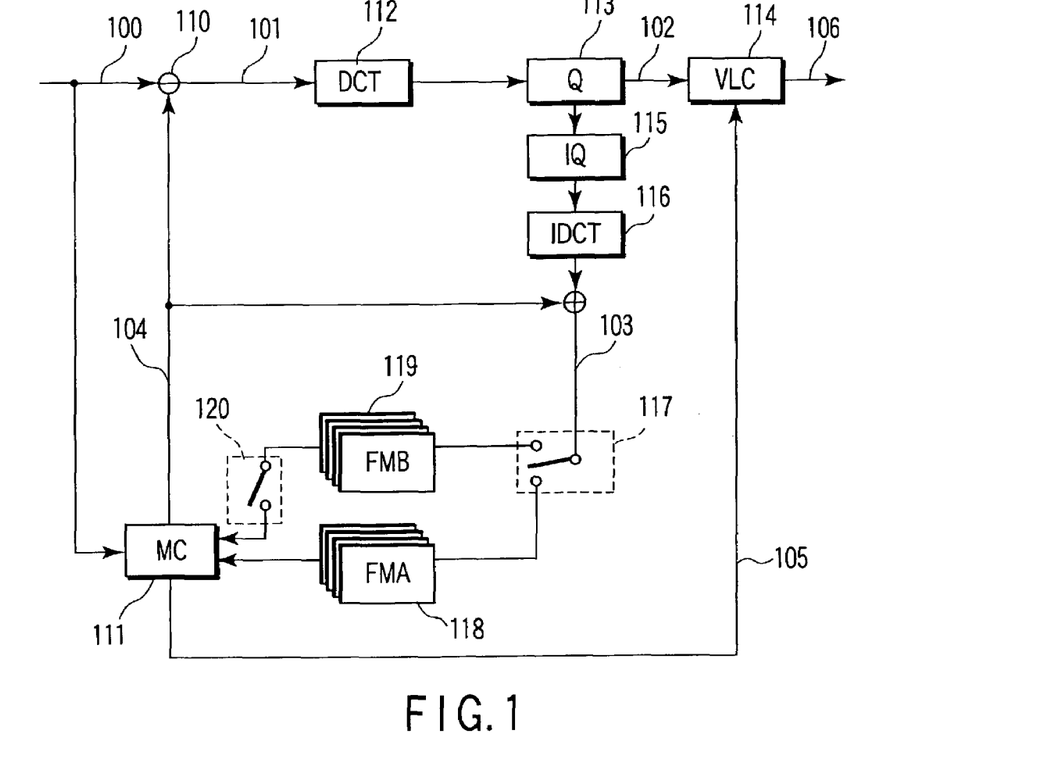
FIG. 1 shows a block diagram of a video encoding apparatus according to one embodiment of the present invention.
Figure 2:
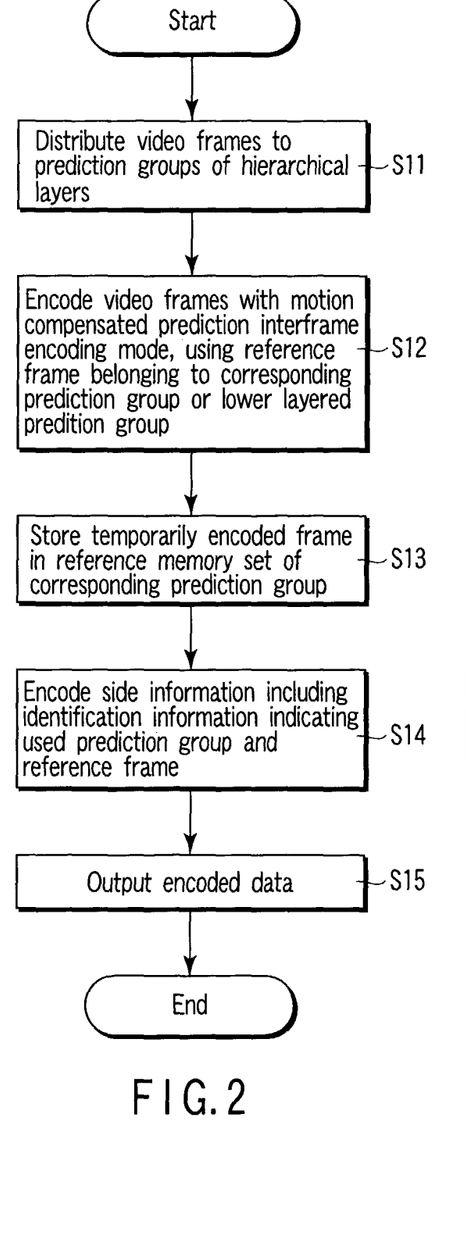
FIG. 2 is a diagram showing a flow of a main process concerning a motion compensated prediction interframe encoding in a video encoding.

FIG. 1 is a block diagram of a video encoding apparatus according to the present embodiment. FIG. 2 is a flow chart indicating steps of a process executed by the motion compensated prediction interframe encoding. The video encoding apparatus shown in FIG. 1 may be realized by hardware, and may be executed by software by means of a computer. A part of the process is executed by the hardware and the remaining part thereof may be executed by the software.

The present embodiment is based on a video encoding which is a combination of a motion compensated prediction, an orthogonal transformation and a variable-length coding, the video encoding being represented by a conventional MPEG scheme. There will now be described a video encoding method based on prediction groups including two hierarchical layers.

A video signal 100 (video frame) is input to a video encoding apparatus every frame. At first the video frame of the video signal 100 is assigned to either of prediction groups of two hierarchical layers by a motion compensation prediction unit 111 (step S11). The video frame is encoded by a motion compensated prediction interframe encoding, using at least one reference frame belonging to a prediction group of at least one hierarchical layer lower than the hierarchical layer of the prediction group to which the video frame is assigned (step S12). In this embodiment, the reference frame stored in the frame memory set 118 is used.

The assignment of the video frame to the prediction group of each hierarchical layer is changed between frames with time. For example, the even numbered frame is assigned to the prediction group of the first hierarchical layer, and the odd numbered frame to the prediction group of the second hierarchical layer. The reference frame belonging to the prediction group of each hierarchical layer is determined according to the prediction group belonging to the video frame corresponding to the encoded frame used as a reference frame. In other words, if a video frame is assigned to a prediction group of a hierarchical layer, the encoded frame obtained by encoding and local-decoding the video frame belongs to the prediction group of the same hierarchical layer. The process of steps S11 and S12 is explained in detail.

As described above, a plurality of encoded frames belong to the prediction groups of the first and second hierarchical layers as reference frames. Two reference memory sets 118 and 119 are prepared for temporarily storing the encoded frames as the reference frames. The encoded frames belonging to the prediction group of the first hierarchical layer (i.e., the lowest hierarchical layer) are temporarily stored as reference frames in the first reference memory set 118. The encoded frames belonging to the prediction group of the second hierarchical layer (i.e., the higher hierarchical layer) are temporarily stored as the reference frames in the second reference memory set 119.

The video frame assigned to the prediction group of the first hierarchical layer is subjected to the motion compensated prediction interframe encoding, using the reference frame belonging to the prediction group of the first hierarchical layer and stored in the first reference memory set 118. On the other hand, the video frame assigned to the prediction group of the second hierarchical layer is subjected to the motion compensated prediction interframe encoding, using the reference frames belonging to both prediction groups of the first and the second hierarchical layers and stored in the first and second reference memory sets 118 and 119.

The motion compensated prediction frame encoding will be concretely explained. When the video frame corresponding to the video signal 100 belongs to the prediction group of the first hierarchical layer, one or more reference frames temporarily stored in the first reference memory set 118 are read out therefrom and input to the motion compensation prediction unit 111. In this time, the switch 120 is OFF, so that the reference frame from the first reference memory set 119 is not input to the motion compensation prediction unit 111. The motion compensation prediction unit 111 executes the motion compensated prediction using one or more reference frames read out from the reference memory set 118 to generate a prediction picture signal 104. The prediction picture signal 104 is input to the subtracter 110 to generate a predictive error signal 101 that is an error signal of the prediction picture signal 104 with respect to the input video signal 100.

When the video frame corresponding to the input video signal 100 belongs to the prediction group of the second hierarchical layer, the switch 120 is ON. In this time, one or more reference frames temporarily stored in the first and second reference memory sets 118 and 119 are read out therefrom, and input to the motion compensation prediction unit 111. The motion compensation prediction unit 111 generates the prediction picture signal 104 and supplies to the subtracter 110 similarly to the above. The subtracter 110 generates the predictive error signal 101.

The predictive error signal 101 is subjected to a discrete cosine transformation with the DCT transformer 112. The DCT coefficient from the DCT transformer 112 is quantized with the quantizer 113. The quantized DCT coefficient data 102 is divided in two routes, and encoded by the variable-length encoder 114 in one route. The DCT coefficient data 102 is reproduced as a predictive error signal by the dequantizer 115 and inverse DCT transformer 116 in the other route. This reproduced predictive error signal is added to the prediction picture signal 104 to generate a local decoded picture signal 103.

The encoded frame corresponding to the local decoded picture signal 103 is temporarily stored in either of the first and second reference memory sets 118 and 119 according to the prediction group of the hierarchical layer to which the video frame corresponding to the input video signal 100 is assigned (step S13). In other words, when the video frame belongs to the prediction group of the first hierarchical layer, the encoded frame is temporarily stored in the first reference memory set 118. When the video frame belongs to the prediction group of the second hierarchical layer, the encoded frame is temporarily stored in the second reference memory set 119.

From the motion compensation prediction unit 111 is output so-called side information 105 including a motion vector used for a motion compensated prediction, an index (first identification information) for identifying the prediction group to which the video frame belongs and an index (second identification information) which specifies the reference frame used for the motion compensated prediction interframe encoding. The side information is encoded by the variable-length encoding unit 114 (step S14). In this case, the index for identifying the prediction group is encoded as a picture type representing, for example, a prediction configuration. The index specifying the reference frame is encoded every macroblock.

These side information are output as variable-length coded data 106 along with the quantized DCT coefficient data which is a result of the motion compensated prediction interframe encoding (step S15). For example, the side information is encoded as header information to encoded data 106. Further, if a second reference frame number setting method is adopted, information indicating the maximum number of frames is encoded as header information to the encoded data 106. The second reference frame number setting method is a method of setting the maximum number of reference frames assigned to the prediction group of each hierarchical layer by predefining the total number of reference frames belonging to the prediction group of each hierarchical layer. The encoded data 106 is sent to a storage medium or a transmission medium (not shown).

The new decoded frames are sequentially written in the reference memory sets 118 and 119 as reference frames. So-called FIFO (First-In First-Out) type control that the stored frames are sequentially deleted from the oldest reference frame is performed in units of a frame. However, when the reference frame is read out, a random access is done to an arbitrary reference frame in each of the reference memory sets 118 and 119.

The number of reference frames temporarily stored in the reference memory sets 118 and 119 respectively, in other words, the number of reference memories included in each of the reference memory sets 118 and 119 is determined by either of the following two methods.

In the first reference frame number setting method, the maximum number of reference frames belonging to the prediction group of each hierarchical layer is previously established according to an encoding method or an encoding specification such as a profile and a level. In the video encoding apparatus and the video decoding apparatus, the maximum number of the reference frames determined as described above is assured every prediction group, and encoding and decoding are done. In this case, the necessary number of reference frames can be assured automatically, by making the encoding specification coincide between the video encoding apparatus and the video decoding apparatus.

In the second reference frame number setting method, the total number of reference frames belonging to the prediction group of each hierarchical layer is predefined according to an encoding method or an encoding specification such as a profile and a level, and information on how many reference frames are assigned to the prediction group of each hierarchical layer, that is, information indicating the maximum number of frames is encoded as header information to the encoded data 106.

As thus described, in the second reference frame number setting method, the maximum number of reference frames which are most suitable for the prediction group of each hierarchical layer is dynamically assigned to the prediction group in the encoding side.

By encoding information indicating the assigned maximum number of frames, it is possible to make the maximum number of reference frames belonging to the prediction group of each hierarchical layer coincide between the encoding side and the decoding side. Therefore, a ratio of the maximum number of reference frames belonging to the prediction group of each hierarchical layer with respect to the total number of reference frames is suitably changed according to the change of the image nature of the input video signal 100. As a result, the encoding efficiency is improved.

In the above explanation, the encoding is performed in units of frames. The encoding is performed in units of blocks (macroblocks). In other words, the video block is assigned to one of a plurality of prediction groups including at least first and second prediction groups. The video block is encoded according to a motion compensated prediction encoding mode, using the reference blocks depending on the one of the prediction groups to which the video block is assigned, one of the reference blocks being a decoded block. The first prediction group is obtained by a prediction using the reference blocks belonging to the first prediction group. The second prediction group is obtained by a prediction using the reference blocks belonging to at least one of the second prediction group and the first prediction group.

The video block is encoded by each of an intraframe encoding mode, a forward prediction interframe encoding mode and a bi-directional prediction interframe encoding mode. The first video blocks encoded by the intraframe encoding mode and the forward prediction interframe encoding mode and the reference blocks corresponding to the first video blocks are assigned to the first prediction group. The second video blocks encoded by the bi-directional prediction interframe encoding mode and the reference blocks corresponding to the second video blocks are assigned to at least one of the first and second prediction groups.

(Decoding)

Figure 3:
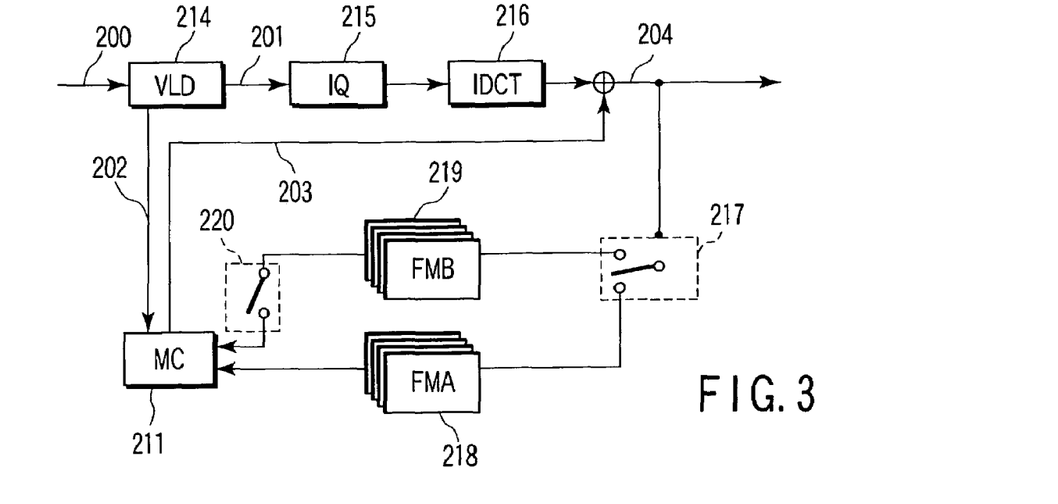
FIG. 3 shows a block diagram of a moving image decoding apparatus according to one embodiment of the present invention.
Figure 4:
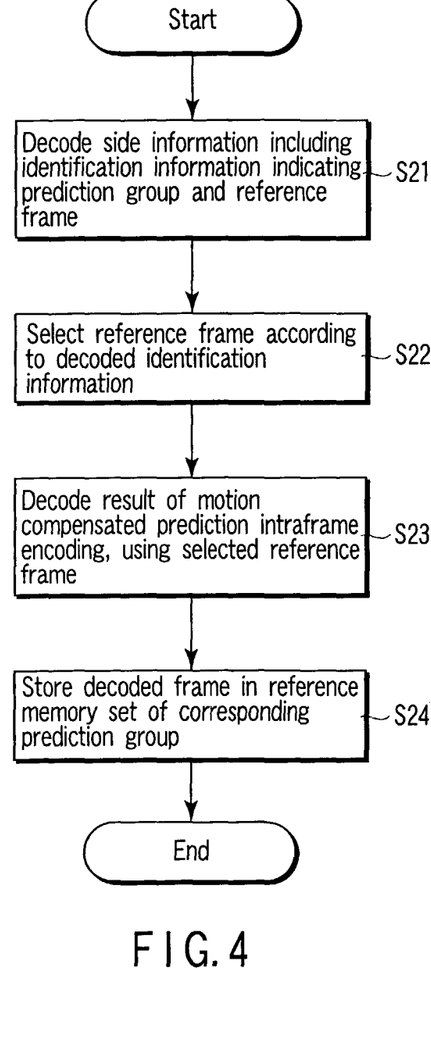
FIG. 4 shows a flow of a main process for decoding a result of a motion compensated prediction interframe encoding.

FIG. 3 is a block diagram of a video decoding apparatus corresponding to the video encoding apparatus shown in FIG. 1. FIG. 4 is a flow chart indicating steps of a process concerning the decoding corresponding to the motion compensated prediction interframe encoding. The video decoding apparatus shown in FIG. 3 may be realized by hardware, and may carry out by software. Alternately, a part of the process is executed by the hardware and the remaining part may be executed by the software.

The encoded data 106 output from the video encoding apparatus shown in FIG. 1 is input to the video decoding apparatus shown in FIG. 3 through the storage medium or transmission medium. The input encoded data 200 is subjected to a variable-length decoding by a variable-length decoder 214, so that quantized DCT coefficient data 201 and side information 202 are output. The quantized DCT coefficient data 201 is decoded via the dequantizer 215 and inverse DCT transformer 216 so that a predictive error signal is reproduced.

On the other hand, side information 202 including a motion vector encoded every macroblock, an index (first identification information) identifying the prediction group belonging to each video frame and an index (second identification information) specifying a reference frame is decoded (step 21). The selection of reference frame and motion compensation is performed according to the side information similarly to the encoding to generate a prediction picture signal 203. In other words, the reference frame is selected according to the first identification information and the second identification information (step S22). The result of the motion compensated prediction interframe encoding is decoded by the selected reference frame (step S23). The prediction picture signal 203 and the predictive error signal from the inverse DCT transformer 216 are added to generate a decoded picture signal 204.

The decoded frame corresponding to the decoded picture signal 204 is temporarily stored in either of the first and second reference memory sets 218 and 219 according to the prediction group to which the encoded frame corresponding to the decoded frame belongs (step S24). The decoded frame is used as the reference frame. These reference memory sets 218 and 219 are controlled in FIFO type similarly to the video encoding apparatus. The number of reference frames belonging to the prediction group of each hierarchical layer is set according to the first and second reference frame number setting methods described in the video encoding apparatus.

In other words, when the maximum number of reference frames belonging to the prediction group of each hierarchical layer is predefined according to the first reference frame number setting method and the encoding specification, the number of reference frames belonging to the prediction group of each hierarchical layer is set to a fixed value every encoding specification. When the total number of reference frames belonging to the prediction group of each hierarchical layer is predefined according to the second reference frame number setting method and the encoding specification, and the maximum number of reference frames is assigned to the prediction group of each hierarchical layer. Only the total number of reference frames is fixed, and the number of reference frames belonging to the prediction group of each hierarchical layer is dynamically controlled based on information indicating the maximum number of reference frames decoded according to the header information of encoded data.

Figure 5:
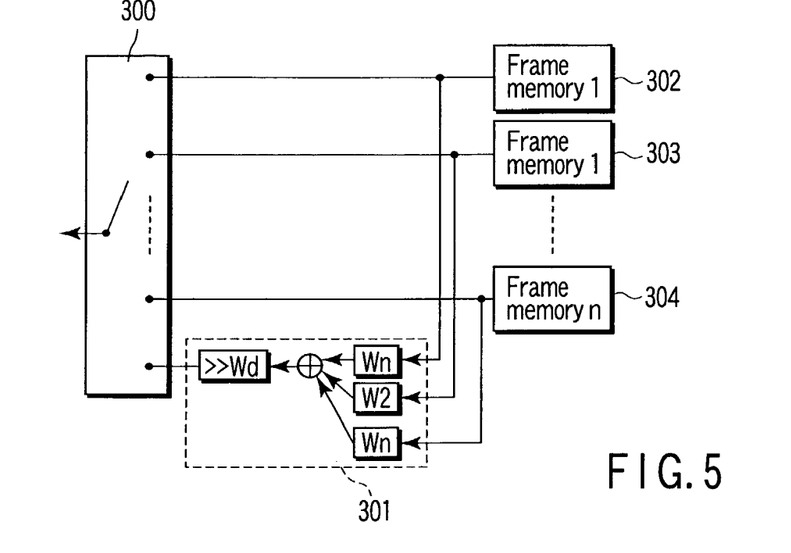
FIG. 5 is a block diagram of a motion compensated prediction unit used for a video encoding apparatus and a video decoding apparatus according to the above embodiment.

FIG. 5 shows a configuration of the motion compensation prediction unit 111 in the video encoding apparatus shown in FIG. 1 or the motion compensation prediction unit 211 in the video decoding apparatus shown in FIG. 3.

As mentioned above, available reference frames differ according to the prediction group of the hierarchical layer to which the frame to be encoded or the frame to be decoded belongs. Assuming that frame memories 302 to 304 in FIG. 5 store reference frames available as a reference frame for the encoded frame belonging to the prediction group of one hierarchical layer.

The motion compensation prediction unit selects one from among the available reference frames every macroblock or calculates a linear sum of the available reference frames by the linear predictor 301 to predict a reference frame based on the linear sum, whereby a motion compensation is performed to generate a prediction macroblock.

The video encoding apparatus selects the reference frame and the motion vector every macroblock so that the prediction macroblock with a small prediction error and a highest encoding efficiency is selected. The information of the selected reference frame and the information of the motion vector are encoded every macroblock.

In the video decoding apparatus, the motion compensation unit generates and decodes a prediction macroblock according to the received motion vector and information of the reference frame. When the prediction is performed based on the linear sum, information concerning the linear prediction coefficient is encoded as header information of the encoded data to make the linear predictor coefficient coincide between encoding and decoding.

FIGS. 6 to 11 show diagrams for explaining an interframe prediction configuration and a reference memory control in the present embodiment.

FIG. 1 shows an example configured by I and P pictures and switching each frame alternatively between a prediction group a and a prediction group b. Assuming that the prediction group b is a higher hierarchical layer than the prediction group a. Also, it is assumed that the reference memory of each of the prediction group a and the prediction group b is one frame.

A picture with a suffix a such as Ia0, Pa2 or Pa4 belongs to the prediction group a, and a picture with a suffix b such as Pb1, Pb3 or Pb5 belongs to the prediction group b. The attributes of these prediction groups are encoded as an extension of a picture type or an independent index and are used as header information of the video frame. The video frame belonging to the prediction group a can use only the frame belonging to the prediction frame a and already decoded as a reference frame.

As for the prediction frame b of the higher hierarchical layer, a prediction picture is generated using one frame belonging to either of the prediction group a and the prediction group b and already decoded or a linear sum of both decoded frames.

The prediction group of each hierarchical layer has a reference memory corresponding to one frame. Thus, the number of reference frame for the video frame of the prediction group a is 1 in maximum. Two reference frames in maximum can be used for the video frame of the prediction group b. The frame Pa2 belonging to, for example, the prediction group a uses only the decoded frame Ia0 as the reference frame. The frame Pb3 belonging to the prediction group b uses two frames, i.e., the decoded frame Pa2 belonging to the prediction group a and the decoded frame Pb1 belonging to the prediction group b as the reference frame.

Figure 6:
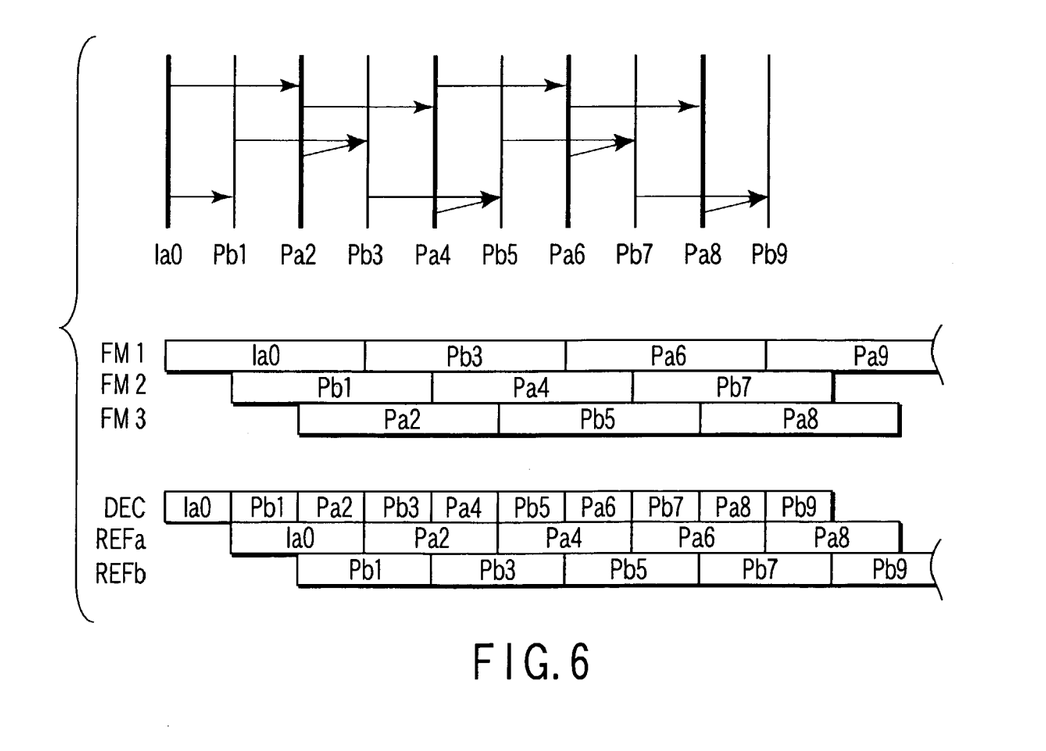
FIG. 6 is a diagram showing an example of an interframe prediction configuration and reference frame control according to one embodiment of the present invention.

In FIG. 6, FM1, FM2 and FM3 show physical reference memories. DEC, REFa and REFb show logical reference memories respectively. In other words, DEC, REFa and REFb are the frame memories expressed by virtual addresses. FM1, FM2 and FM3 are the frame memories expressed by physical addresses. In virtual address expression, DEC is a frame memory for temporarily storing a currently decoded frame. REFa and REFb show reference memories of the prediction groups a and b, respectively. Therefore, the decoded frames belonging to the prediction group a are sequentially and temporarily stored in the reference memory REFa. The decoded frames belonging to the prediction group b are sequentially and temporality stored in the reference memory REBb.

In the example of FIG. 6, it is possible to discard the video frame belonging to the prediction group b of the higher hierarchical layer and decode only a frame belonging to the prediction group a. In this case, if there are two reference memories, e.g., a frame memory DEC for temporarily storing a currently decoded frame and a reference memory REFa of the prediction group a, decoding is possible.

It is possible to decode the frame at a half frame period without breaking down a prediction configuration by decoding only the frame belonging to the prediction group a. A smooth fast-forward playback can be performed by playing back the decoded frame belonging to the prediction group a at a frame rate of 2 times, for example. Also, when the bandwidth of a transmission channel fluctuates along with time in a video streaming, all encoded data are transmitted in normal cases. When the effective bandwidth of the transmission channel decreases, the encoded data belonging to the prediction group b is discarded and only the encoded data belonging to the prediction group a of the lower hierarchical layer is sent. In this case, the decoded frame can be reproduced without failure on the receiving side.

Figure 7:
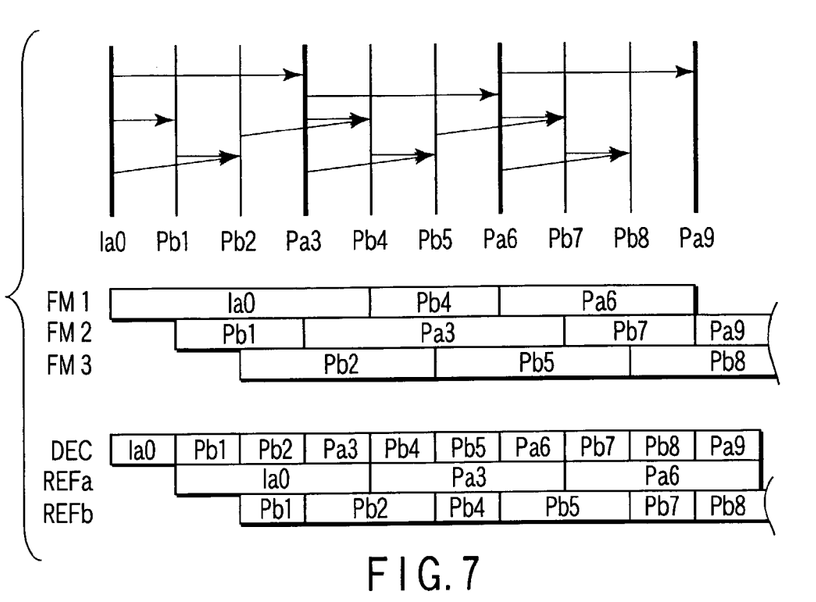
FIG. 7 is a diagram showing an example of an interframe prediction configuration and reference frame control according to one embodiment of the present invention.

FIG. 7 shows a modification of FIG. 6, and illustrates a prediction configuration that two frames belonging to the prediction group b are inserted between the frames belonging to the prediction group a. The reference memory of the prediction group of each hierarchical layer is one frame. For this case, decoding is possible by using a frame memory for three frames similarly to FIG. 6. In the example of FIG. 7, by decoding only frames of, for example, the prediction group a and playing back the encoded frames at an original frame rate, it is possible to perform a smooth three-times fast-forward playback.

Figure 8:
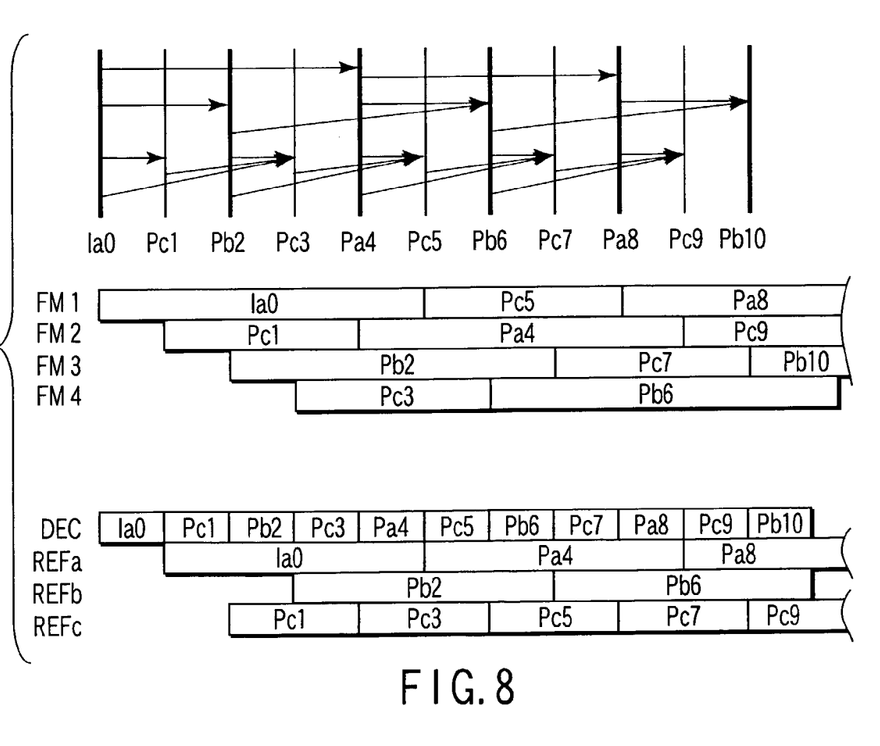
FIG. 8 is a diagram showing an example of an interframe prediction configuration and reference memory control according to one embodiment of the present invention.

FIG. 8 shows a prediction configuration which is configured by I and P pictures and whose prediction group includes three hierarchical layers a, b and c. The frames of the prediction group a are assigned every four input frames. One frame of the prediction group b and two frames of the prediction group c are inserted between the frames of the prediction group a.

The reference frame of the prediction groups a, b and c of respective hierarchical layers is one frame. The hierarchy increase in an order of a, b and c. In other words, the frame belonging to the prediction group a can use only one frame of the decoded prediction group a as a reference frame. The frame belonging to the prediction group b can use two frames of the decoded prediction groups a and b as reference frames. The frame belonging to the prediction group c can use three frames of the decoded prediction groups a, b and c as reference frames.

In FIG. 8, DEC, REFa, REFb and REFc show a frame memory for temporarily storing a decoded frame, and logical frame memories for storing the reference frames of the prediction group a, the reference frames of the prediction group b and the reference frames of the prediction group c, respectively. FM1, FM2, FM3 and FM4 show physical frame memories for the above four frames, respectively. One frame that has been decoded just before the current frame is temporarily stored in the reference memories REFa, REFb and REFc. The currently decoded frame is written in the decoded frame memory DEC.

In the configuration of FIG. 8, the prediction group includes three hierarchical layers. Therefore, when all encoded frames not more than the prediction group c are decoded, a normal playback is performed. When the encoded frames not more than the prediction group b are decoded, the frames ½ of the normal number of frames are decoded. When the encoded frames not more than the prediction group a are decoded, the frames ¼ of the normal number of frames are decoded. In either decoding, the normally decoded picture can be generated without failure of the prediction configuration. The fast-forward playback at a smoothly adjustable speed can be realized by dynamically controlling the hierarchical layer to be decoded. Alternatively, a transmission bit rate is dynamically changed by dynamically controlling the hierarchical layer to be transmitted.

Figure 9:
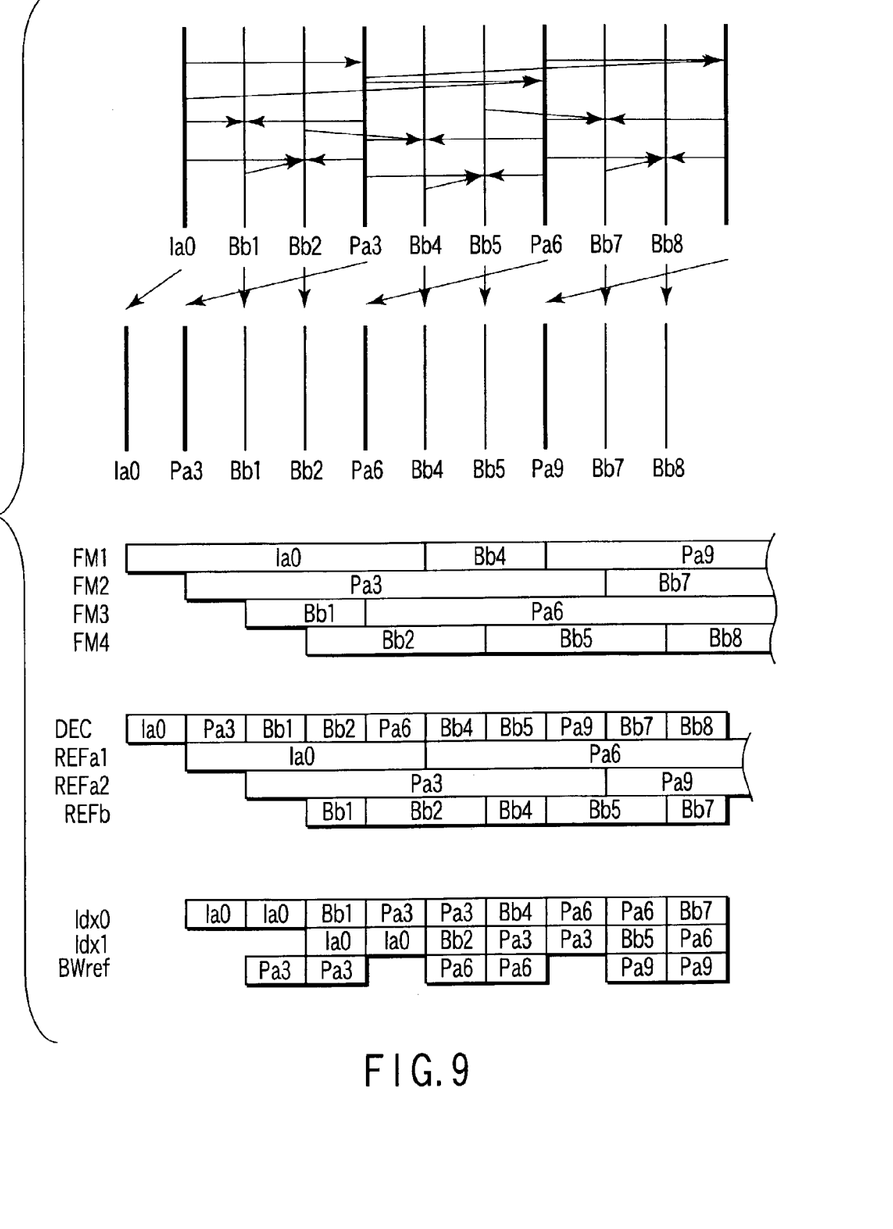
FIG. 9 is a diagram showing an example of an interframe prediction configuration and reference memory control according to one embodiment of the present invention.

In FIG. 9, the prediction configuration comprises I, P and B pictures, I and P pictures are assigned to the prediction group a and B picture to the prediction group b. The prediction group b assumes a higher hierarchical layer that that of the prediction group a. The prediction group a includes two frames, i.e., two reference memories, and the prediction group b includes one frame, i.e., one reference memory.

In the example of FIG. 9, the number of reference memories of I and P pictures of the prediction group a is 2.

Therefore, it is possible to use two frames as reference frames, one of the two frames being I or P picture that is encoded or decoded just before a current P picture and the other being I or P pictures at two frames before the current P picture. In B picture, the prediction group b has one reference frame. Therefore, one frame of B picture encoded or decoded just before the current frame is used as a reference frame. Further, it is possible to use the reference frames of three frames that are formed from B picture and I and P pictures of two past frames included in a prediction group corresponding to the lower hierarchical layer.

Similarly to FIGS. 6 to 8, FM1, FM2, FM3 and FM4 show physical frame memories, and DEC, REFa1, REFa2 and REFb show logical frame memories. DEC shows a frame memory for temporarily storing a frame during decoding. REFa1 and REFa2 show reference memories corresponding to two frames of the prediction group a. REFb shows a reference memory corresponding to one frame of the prediction group b.

Idx0 and Idx1 in FIG. 9 show indexes to specify the reference frames for a frame during decoding. In decoding, for example, a frame Pa6, two frames Pa3 and Ia0 just before the frame Pa6 and belonging to the prediction group a are candidates of the reference frame. The indexes of the reference frames are assigned in sequence to the frames that are time-closer to the video frame. The index indicating the reference frame is encoded every macroblock and the reference frame is selected every macroblock. With respect to the macroblock of the index 0, the prediction image is generated by I or P picture just before the picture corresponding to the macroblock. With respect to the macroblock of the index 1, the prediction image is generated by I or P picture at two frames before the picture corresponding to the macroblock. When the prediction image is generated by a linear sum of I or P picture just before the current picture and I or P picture at two frames before the current picture, an index identifying a pair of indexes 0 and 1 is encoded as header information of a macro book.

BWref in FIG. 9 shows a reference frame for the backward prediction of B picture. In the example of FIG. 9, the backward reference frame for pictures Bb1 and Bb2 is a picture Pa3, and the backward reference frame for pictures Bb4 and Bb5 is a picture Pa6. The reference frame of the backward prediction is limited to I or P picture encoded or decoded just before due to constraint of sorting of frames. Thus, the reference frame is uniquely determined. Therefore, the reference frame BWref of the backward prediction should not be encoded as header information.

The forward prediction of B picture can be performed by two frames selectable in maximum in the example of FIG. 9. In encoding and decoding of, for example, the picture Bb4, the picture Pa3 that is a frame just before the picture Bb4 in time and belongs to the prediction group a and the picture Bb2 that is a frame at two frames before the picture Bb4 and belongs to the prediction group b can be used as the reference frames. An index indicating which reference frame is selected every macroblock or whether a prediction is performed by the linear sum of both reference frames is encoded. Two kinds of pictures Bb4 and Pa3 are used as the reference frames similarly to the picture Bb5.

As for the indexes of the reference frames, numbering is added to the reference frames every video frame in a sequence to be time-closer to the reference frame for the forward prediction. In the example of FIG. 9, in encoding and decoding of P picture, I or P pictures stored in the reference memory are arranged in a time order and numbered. In encoding and decoding of B picture, all reference frames stored in the reference memory, except for I or P picture that is encoded or decoded just before that it is used as the reference frame for the backward prediction, are arranged in a time order and numbered. Idx0 and Idx1 in FIG. 9 indicate indexes generated according to the above rule.

Figure 10:
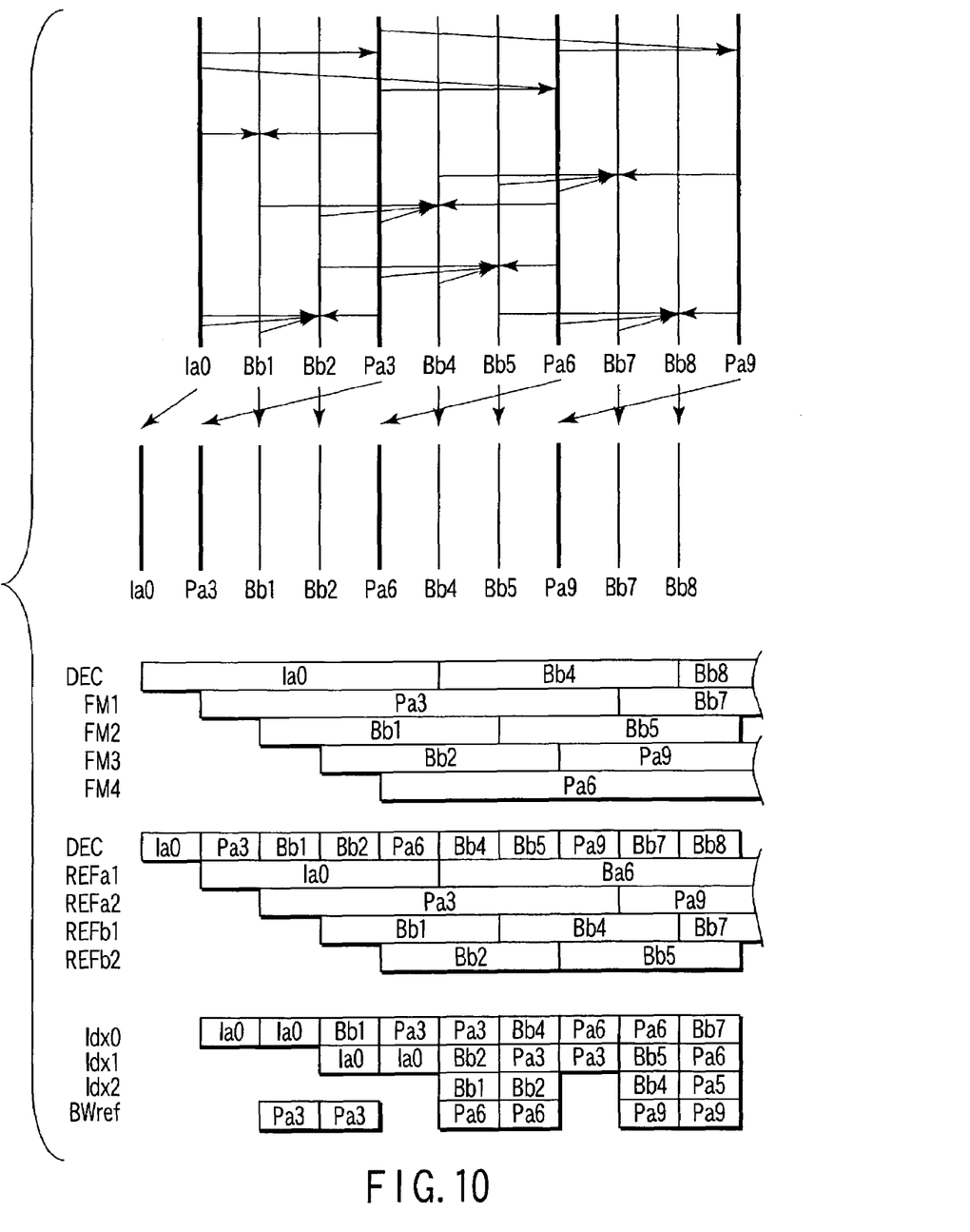
FIG. 10 is a diagram showing an example of an interframe prediction configuration and reference memory control according to one embodiment of the present invention.

FIG. 10 is a modification of FIG. 9, and shows a case that sets the number of reference frame to 2 and the total number of frame memories to 5 with respect to the prediction group b, that is, B picture, too. FM1 to FM5 show physical reference frames. DEC shows a buffer that temporarily stores a picture in decoding. REFa1 and REFa2 show the prediction group a, namely, reference memories for I and P pictures. REFb1 and REFb2 show the prediction group b, namely, logical reference memories for B picture respectively. Idx0, Idx1 and Idx2 indicate reference frame indexes allocated in the forward prediction. BWref shows a reference frame for the backward prediction of B picture. The reference frame index in the forward prediction is encoded as header information every macroblock similarly to the example of FIG. 9.

In the examples of FIGS. 6 to 10, the number of reference memories of the prediction group of each hierarchical layer is fixed. However, the number of reference frames of the prediction group of each hierarchical layer may be dynamically changed under the constant total number of reference frames. In the configuration of, for example, FIG. 6, the number of reference memories of the prediction group b is set to 0, and at the same time the number of reference memories of the prediction group a is set to 2. Such a change may be notified with header information of encoded data from the encoding side to the decoding side. On that occasion, the selection of motion compensated prediction is controlled so that the prediction from two past frames of the prediction group a can be employed in the encoding side, and the prediction from the past frame of the prediction group b is prohibited whereas the prediction from two past frames of the prediction group a is performed.

In the above explanation, the decoding is performed in units of frames. The decoding is performed in units of blocks (macroblocks). In other words, the coded data includes encoded video block data, first encoded identification information indicating first and second prediction groups to which the video block data is assigned and second encoded identification information indicating reference block data used in the motion compensated prediction interframe encoding. The first encoded identification information and the second encoded identification information are decoded to generate first decoded identification information and second decoded identification information. The video block data is decoded using the reference block data belonging to the first prediction group and the reference block data belonging to at least one of the first and second prediction groups according to the first decoded identification information and the second decoded identification information.

Figure 11:
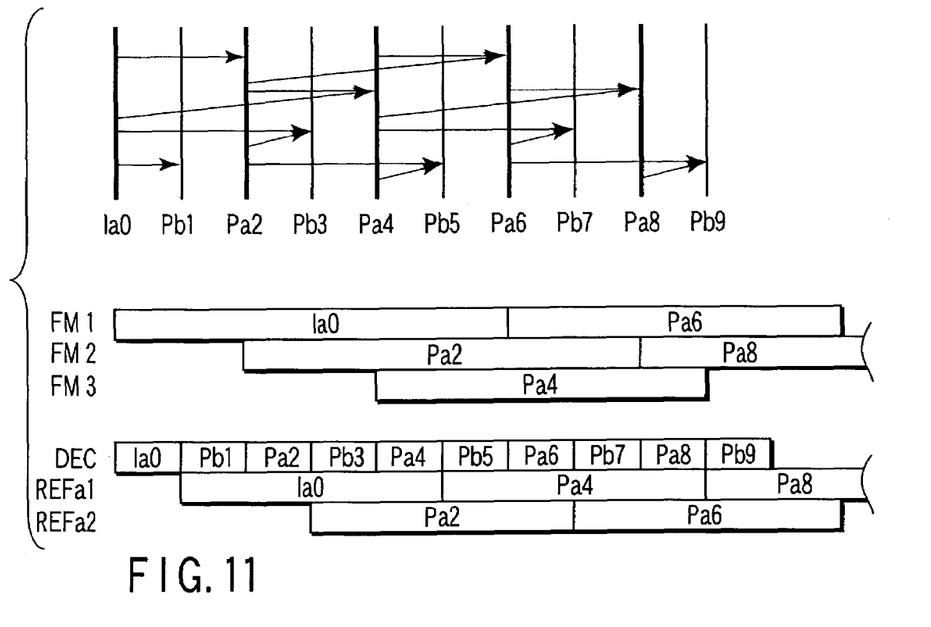
FIG. 11 is a diagram showing an example of an interframe prediction configuration and reference memory control according to one embodiment of the present invention.

FIG. 11 shows a prediction configuration and how to use the frame memory when allocation of the reference memories is changed to the example of FIG. 6 as described above.

The above way enables dynamically to set an optimum prediction configuration suitable for an input video image in the limited number of reference frames. Also, the way enables a high efficiency encoding with improved prediction efficiency.

Figure 12:
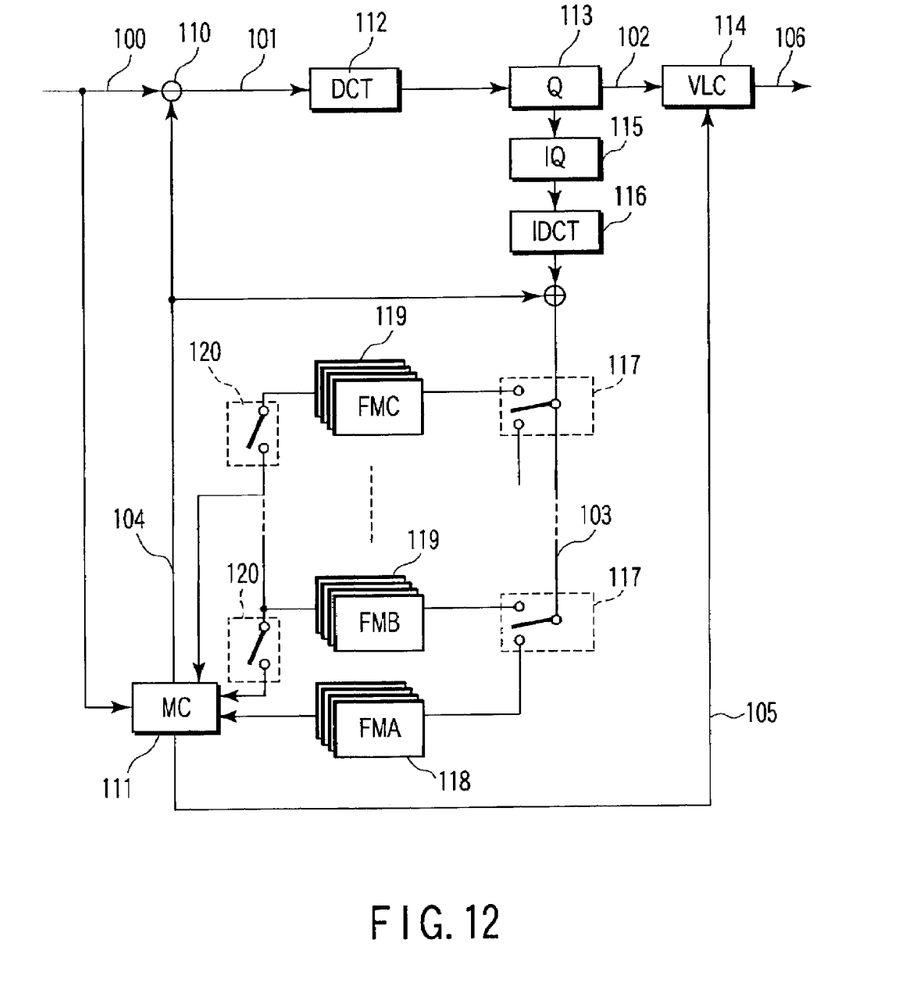
FIG. 12 shows a block diagram of a video encoding apparatus according to a modification of the embodiment of the present invention.
Figure 13:
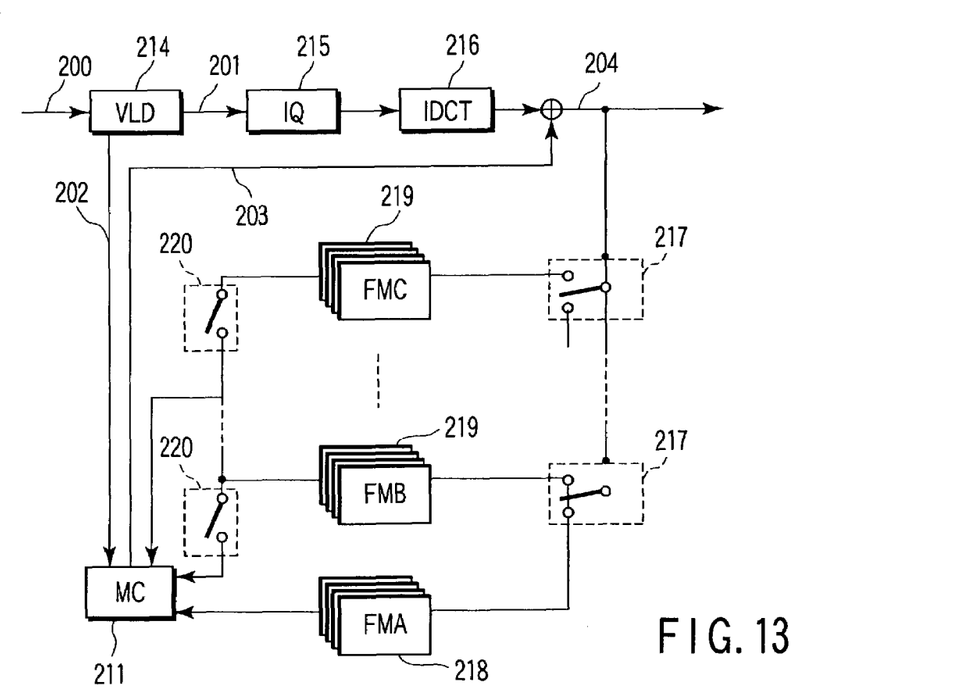
FIG. 13 shows a block diagram of a moving image decoding apparatus according to a modification of the embodiment of the present invention.

FIGS. 12 and 13 show a video encoding apparatus and a video decoding apparatus using prediction groups not less than three hierarchical layers, respectively. According to this, the reference frame set 118 or 218 belong to the lowest hierarchical layer. Two or more reference frame sets 119 belonging to higher hierarchical layers and two or more switches 117 and 120 are provided in the video encoding apparatus. Two or more reference frame sets 219 belonging to higher hierarchical layers and two or more switches 217 and 220 are provided in the video decoding apparatus. When the switches 117 and 120 or the switches 217 and 220 are closed according to the number of hierarchical layers, the number of the reference frames is increased. In other words, the switches 117 and 120 or the switches 217 and 220 are sequentially closed according to incrementation of a hierarchy. More specifically, a plurality of video frames assigned to a plurality of prediction groups sequentially layered from a prediction group of a lowest hierarchical layer to at least one prediction group of a higher hierarchical layer than the lowest hierarchical layer. The video frames are subjected to a motion compensated prediction interframe encoding, using reference frames belonging to the prediction group of the lowest hierarchical layer and the prediction group of the hierarchical layer lower than that of the prediction group to which the video frames are assigned.

As described above, an interframe prediction configuration is made up as a layered prediction group configuration. An interframe prediction from the reference frame of the prediction group of a higher hierarchical layer is prohibited. In addition, the number of reference frames of the prediction group of each hierarchical layer is dynamically changed under the constant total number of reference frames, resulting in that the encoding efficiency is improved and the fast-forward playback can be realized with a high degree of freedom.

When the hierarchy is increased, a gentle playback can be done in the fast-forward playback. Also, since a period of frame, i.e., a frame frequency increases, a picture quality is improved in the fast-forward playback.

When the multi-hierarchical layer video image described above is played back with a home television, all hierarchical layers can be played back. When the multi-hierarchical layer video image is played back with a cellular phone, the multi-hierarchical layer video image can be played back with being appropriately skipped in order to lighten a burden of a hardware. That is to say, the hierarchical layers can be selected according to the hardware of the receiver side.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for encoding a video picture using reference pictures, comprising:

assigning a video picture to one of a plurality of prediction groups of hierarchical layers including at least a first hierarchical layer and a second hierarchical layer higher than the first hierarchical layer;

encoding the video picture assigned to a prediction group of the first hierarchical layer according to a motion compensated prediction interframe encoding mode, using a reference picture belonging to the prediction group of the first hierarchical layer;

encoding the video picture assigned to a prediction group of the second hierarchical layer according to the motion compensated prediction interframe encoding mode, using a reference picture belonging to either of the prediction group of the first hierarchical layer and the prediction group of the second hierarchical layer;

encoding first identification information indicating the hierarchical layer of the group to which the video picture belongs and second identification information indicating a prediction mode of the motion compensated prediction interframe encoding mode to generate side information;

outputting the side information together with the video picture encoded according to the motion compensated prediction interframe encoding mode;

setting a sum of the reference pictures assigned to the prediction groups to a constant value; and encoding reference picture number information indicating the number of reference pictures assigned to each of the prediction groups and including the coded reference picture number information in the side information.

2. A video encoding method according to claim 1, wherein assigning the video picture includes encoding the video picture by each of an intraframe encoding mode, a forward prediction interframe encoding mode and a bi-directional prediction interframe encoding mode, and assigning the video picture includes assigning first video pictures encoded by the intraframe encoding mode and the forward prediction interframe encoding mode and the reference pictures corresponding to the first video pictures to the prediction group of the first hierarchical layer, and assigning second video pictures encoded by the bi-directional prediction interframe encoding mode and the reference pictures corresponding to the second video pictures to at least one of the prediction group of the first hierarchical layer and the prediction group of the second hierarchical layer.

3. A video encoding apparatus which encodes a video picture using reference pictures, comprising:

an assigning unit configured to assign the video picture to one of a plurality of groups of hierarchical layers including at least first and second hierarchical layers;

an encoding unit configured to encode the video picture assigned to a group of the first hierarchical layer according to a motion compensated prediction interframe encoding mode, using a reference picture belonging to the group of the first hierarchical layer, and encode the video picture assigned to a group of the second hierarchical layer according to the motion compensated prediction interframe encoding mode, using the reference pictures belonging to the groups of the first and the second hierarchical layers, wherein the encoding unit encodes first identification information indicating the group to which the video pictures belongs and second identification information indicating the reference picture used in the motion compensated prediction interframe encoding to generate side information, and outputs the side information together with the video pictures encoded according to the motion compensated prediction interframe encoding mode; and a setting unit configured to set a sum of the reference pictures assigned to the prediction groups to a constant value, wherein the encoder encodes reference picture number information indicating the number of reference pictures assigned to each of the prediction groups and outputs the side information including the coded reference picture number information.

4. A video encoding apparatus according to claim 3, wherein the encoding unit includes an encoder which encodes the video picture by each of an intraframe encoding mode, a forward prediction interframe encoding mode and a bi-directional prediction interframe encoding mode, and the assigning unit assigns first video pictures encoded by the intraframe encoding mode and the forward prediction interframe encoding mode and the reference pictures corresponding to the first video pictures to the group of the first hierarchical layer, and assigns second video pictures encoded by the bi-directional prediction interframe encoding mode and the reference pictures corresponding to the second video pictures to at least one of the group of first hierarchical layer and the group of the second.

* * * * *